United States Patent
Patel

(10) Patent No.: US 6,517,104 B1
(45) Date of Patent: Feb. 11, 2003

(54) AIR BAG FOR THIRD ROW VEHICLE PASSENGERS

(75) Inventor: Rasik N. Patel, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,628

(22) Filed: Jan. 28, 2002

(51) Int. Cl.[7] ............................................. B60R 21/16
(52) U.S. Cl. ................................. 280/730.2; 280/743.2
(58) Field of Search ........................... 280/730.2, 733, 280/743.1, 743.2

(56) References Cited

U.S. PATENT DOCUMENTS

| | | | |
|---|---|---|---|
| 5,524,924 A | * | 6/1996 | Steffens et al. .......... 280/730.2 |
| 5,540,459 A | | 7/1996 | Daniel |
| 5,586,782 A | * | 12/1996 | Zimmerman et al. .... 280/730.2 |
| 5,899,491 A | * | 5/1999 | Tschaeschke ............ 280/730.2 |
| 5,957,487 A | | 9/1999 | Stutz |
| 6,070,902 A | | 6/2000 | Kowalski et al. |
| 6,099,029 A | | 8/2000 | Haland et al. |
| 6,123,355 A | * | 9/2000 | Sutherland ................ 280/728.2 |
| 6,123,360 A | | 9/2000 | Amin et al. |
| 6,152,482 A | | 11/2000 | Patel et al. |
| 6,158,767 A | * | 12/2000 | Sinnhuber ................ 280/730.2 |
| 6,168,191 B1 | * | 1/2001 | Webber et al. ........... 280/730.2 |
| 6,237,941 B1 | * | 5/2001 | Bailey et al. ............ 280/730.2 |
| 6,293,581 B1 | * | 9/2001 | Saita et al. ............... 280/730.2 |
| 6,332,628 B1 | * | 12/2001 | Tschaeschke ............ 280/730.2 |
| 6,343,811 B1 | * | 2/2002 | Hammer et al. ......... 280/730.2 |
| 6,371,512 B1 | * | 4/2002 | Asano et al. ............ 280/730.2 |
| 6,375,214 B1 | * | 4/2002 | Nishikaji ................ 280/730.2 |
| 6,378,897 B1 | * | 4/2002 | Butters et al. ........... 280/730.2 |

* cited by examiner

Primary Examiner—Paul N. Dickson
Assistant Examiner—Toan C To
(74) Attorney, Agent, or Firm—Gary A. Smith

(57) ABSTRACT

An inflatable occupant restraint for protecting occupants seated in the third row of an automotive vehicle and includes a plurality of inflatable restraint devices mounted approximately vertically adjacent the window between the C pillar and the D pillar and horizontally tethered but movable from a stowed position to an inflated position in response to conditions indicative of the need for inflation of the restraint.

9 Claims, 2 Drawing Sheets

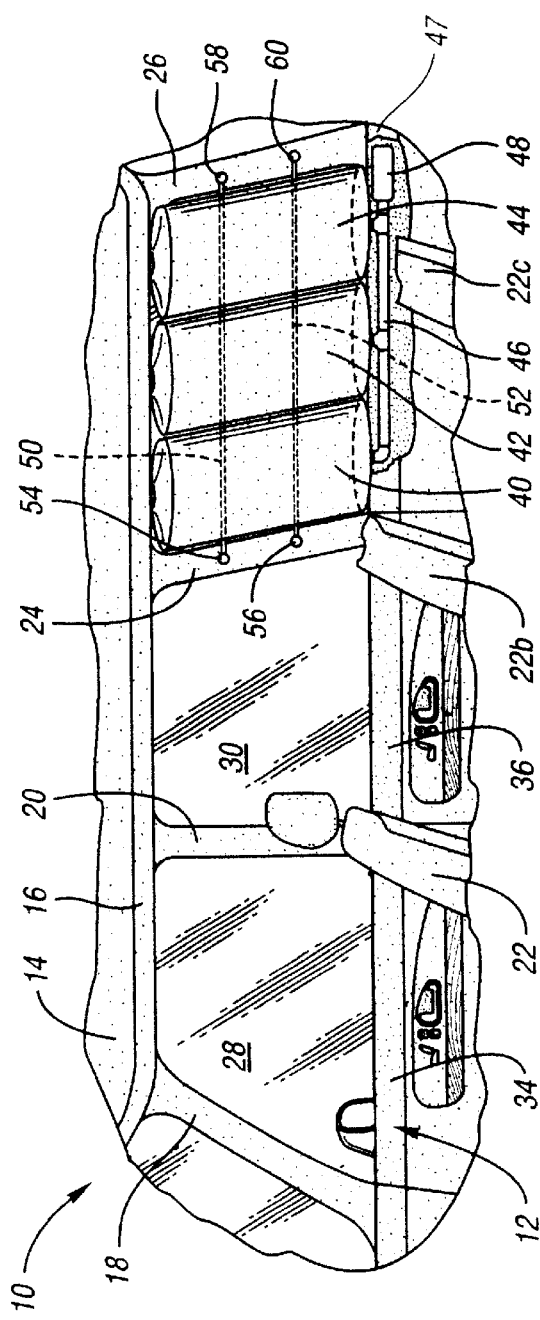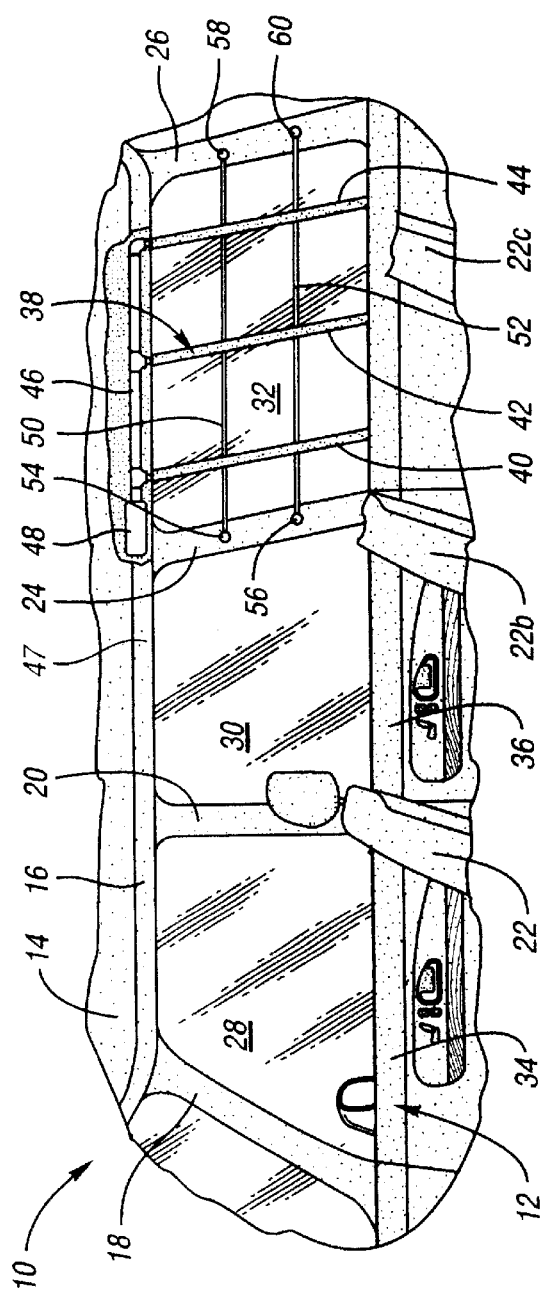

AIR BAG FOR THIRD ROW VEHICLE PASSENGERS

BACKGROUND OF THE INVENTION

1. Field of the Invention

This invention relates generally to inflatable occupant restraints for automotive vehicles and, more particularly, to such restraints deployed on the sides of the vehicles.

2. Background Art

The use of inflatable occupant restraints, or air bags, in automotive vehicles has become common in the automotive industry. Most new vehicles are configured with inflatable occupant restraint systems which respond to frontal impacts. In order to enhance the energy-absorbing capability of their products, the automotive industry has turned its attention to developing energy-absorbing restraints responsive to excessive loading laterally of a vehicle.

One of the areas of the vehicle under consideration for use of inflatable occupant restraints to decrease lateral loading is the interior side of the vehicle, for example, the area between the upper portion of an occupant and the vehicle side glass. A roof side rail mounted side inflatable restraint system is shown in U.S. Pat. No. 5,540,459 (Daniel), assigned to the assignee of the present invention, which is adequate for that portion of the interior vehicle side between the A and B pillars. It has also been proposed to extend the side air bag system across pillars to form a curtain along a substantial portion of the vehicle side interior to provide a restraint for occupants in the first and second row of vehicle seats of passenger vehicles. See, for example, U.S. Pat. 6,152,482 (Patel et al), assigned to the assignee of the present invention. However, merely extending the curtain air bag, in order to provide rollover protection in minivans and sport utility vehicle with a third row of seats, presents several problems including interference with air conditioning ducts located in the roof rail and in meeting time deployment criteria.

SUMMARY OF THE INVENTION

In accordance with the present invention, an inflatable occupant restraint is provided for protecting occupants seated in the third row of an automotive vehicle. The proposed restraint does not deploy through the vehicle trim and is deployed within the time requirement necessary to protect occupants in the third row seats. The proposed restraint is provided in addition to the current curtain design protecting front and second row seat passengers. The proposed restraint can also be used in a rear lift gate with fixed glass for rear impact protection. The inflatable occupant restraint of the present invention includes a plurality of approximately vertically disposed inflatable restraint devices which are connected together and in a preferred embodiment are attached to the side of the vehicle between the C pillar and the D pillar. One or more horizontal tethers secured to the inflatable restraint devices and to the C and D pillars hold the devices in position prior to and after inflation of the devices.

BRIEF DESCRIPTION OF DRAWINGS

FIG. 4 is a second embodiment wherein the inflator for the inflatable restraint is located above the window between the C and D pillars and behind the interior trim panel; and FIG. 5 is a third embodiment in which the inflatable restraint of the present invention is located in the rear of the vehicle on the lift gate.

DETAILED DESCRIPTION

Figure 1:
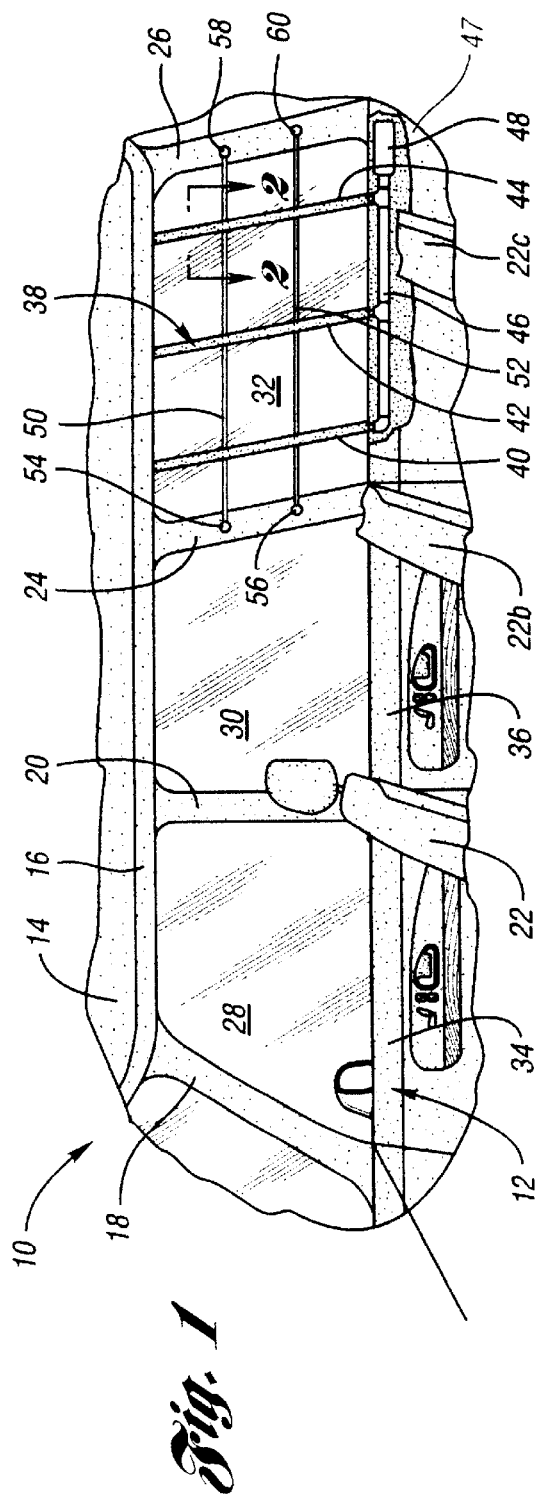
FIG. 1 is an interior view of an automotive vehicle in which the inflatable restraint of the present invention is installed between the C and D pillars of the vehicle.

Referring now to the drawings, and initially to FIG. 1, an automotive vehicle 10, such as a minivan or sport utility vehicle (SUV) is illustrated as having a passenger compartment, generally indicated at 12, partially bounded on the top by a roof 14, as is conventional in vehicle body construction. A roof rail 1 6 is fixedly secured to the roof 14 and to vertically extending pillars, including a forward-most A-pillar 18, a B-pillar 20 generally adjacent the front seats (shown at 22), a C-pillar 24 rearward of the B-pillar 20, and a D-pillar 26 which serves to support the roof in the compartment area rearward of the second row seating. Windows 28, 30, and 32 either movable or fixed, are positioned between the pillars in a known manner. The roof support. pillars 18, 20, 24, and 26, the windows 28, 30, and 32 and other body panels, including the vehicle doors 34,36 collectively comprise the vehicle body side. To provide an energy absorbing cushion between the passenger compartment 12, forward of the C-pillar 24, an inflatable restraint device (not shown) is carried within the roof rail 16. A detailed description of a suitable device for protecting passengers in the first and second row of seats is described in my aforementioned U.S. Pat. No. 6,152,482.

An inflatable restraint device generally designated 38 is provided in accordance with the present invention, to protect the passengers occupying the third row of seats in the vehicle from head injury or ejection during a collision. The device 38 comprises a plurality of device elements generally indicated at 40, 42 and 44 individually inflatable from an inflator 48 and gas duct 46 which are shown mounted behind the trim panel 47 beneath the window 32. Alternatively, the inflator 48 and gas duct 46 may be mounted in the roof rail 16 behind trim paneling 47 as shown in FIG. 4. Each element 40,42,44 is positioned approximately vertically within the passenger compartment adjacent the window 32 extending between the C-pillar 24 and the D-pillar 26. One or more horizontally positioned tethers 50 and 52 are suitably secured to the pillar 24 at 54 and 56 respectively and to the pillar 26 at 58 and 60 respectively by, for example, weld nuts or any other suitable fastening device so that the elements are held against or in close proximity to the window 32 when in a stowed position and are maintained in proper position during inflation.

Figure 2:
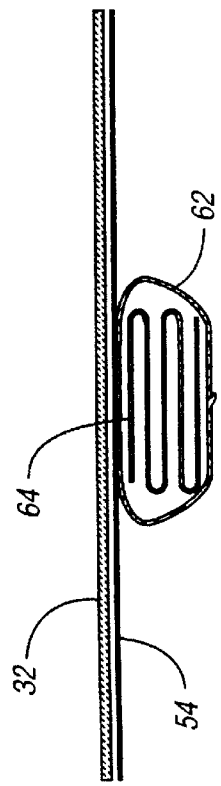
FIG. 2 is a cross-sectional view taken along line 2—2 of FIG. 1 showing the inflatable restraint in a stowed position.
Figure 3:
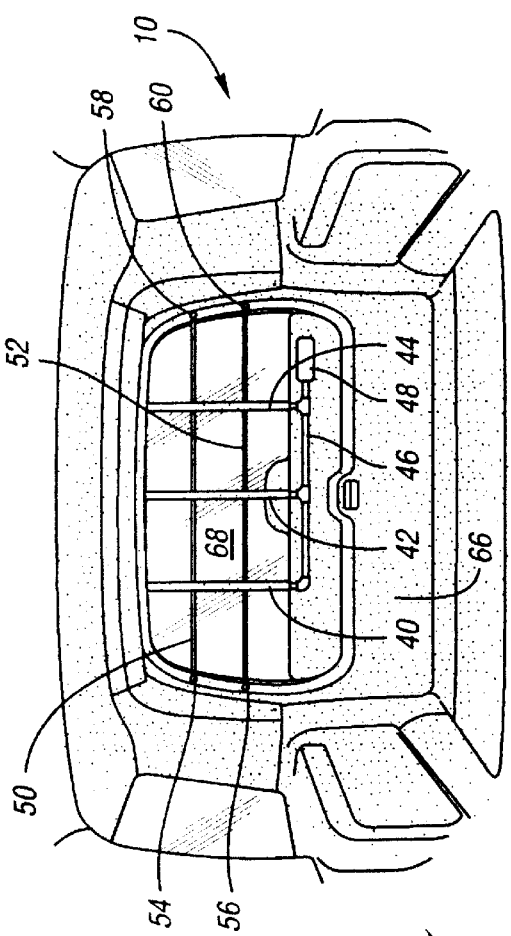
FIG. 3 is an interior view similar to FIG. 1 but showing the inflatable restraint in a deployed position.

As used herein, the term "approximately vertical" refers to an orientation in which elements 40,42,44 have first ends located adjacent roof rail 16 and second ends located adjacent the lower extent of window 32, so that the elements extend across the vertical dimension of the window. The elements 40, 42, and 44 each include a plastic or cloth cover 62 encompassing an inflatable restraint or air bag 64 as shown in FIG. 2. The inflator 48 is operatively connected with each air bag 64 by gas duct 46 to supply inflator gas and inflate each air bag concurrently. Inflator 48 may comprise a pyrotechnic gas generating device, a cold gas storage bottle, or any other appropriate gas source. During inflation, the air bags move from a stowed position shown in FIG. 1 to an inflated position shown in FIG. 3. The tethers 50 and 52 may be formed of the same material as the,bags and are suitably attached to the rear of the bags and may be bonded to the glass window 32. The tethers may also be constructed to inflate along with the elements 40–44.

As shown in FIG. 5, a third embodiment of the invention is shown wherein like element are designated with the same numbers used in FIG. 1. In this embodiment, the inflatable restraint device is positioned to provide rear impact protection. The device is located on the rear lift gate 66 against or in close proximity to the fixed window 68 and maintained in position by the tethers 50 and 52. The device elements 40–44 substantially cover an area defined by the lift gate window when the elements are inflated.

While the best mode for carrying out the invention has been described in detail, those familiar with the art to which this invention relates will recognize various alternative designs and embodiments for practicing the invention as defined by the following claims.

What is claimed is:

1. In an automotive vehicle having a body including a passenger compartment extending longitudinally of the vehicle with an upper end bounded by a roof supported by a plurality of pillars including a C-pillar and a D-pillar defining a window opening therebetween and having a longitudinally extending roof side rail, an inflatable restraint system comprising:

an inflator for discharging inflator gas;

an inflatable restraint comprising a plurality of individual air bags located between said C-pillar and said D-pillar and operatively connected with the inflator to receive inflator gas therefrom for movement outwardly from an uninflated state in which the air bags are oriented vertically and extend between the upper and lower extremities of the window opening to an inflated state covering the window opening;

each of said air bags mounted within the compartment by at least one tether that anchors the air bag to said C-pillar and said D-pillar between upper and lower extremities of said pillars.

2. The system of claim 1, wherein the air bags deploy in a vertical orientation.

3. The system of claim 2 wherein said at least one tether is a horizontal tether that maintains the air bags in position between the C and D pillars during inflation.

4. The system of claim 3, wherein each air bag is folded within a containing cover.

5. The system of claim 4, wherein the inflator is positioned behind trim paneling beneath said window opening between the C and D pillars.

6. The system of claim 4, wherein the inflator is positioned behind trim paneling above said window opening between the C and D pillars.

7. A method of protecting passengers in rear seats of a vehicle comprising the steps of:

locating a plurality of approximately vertically disposed inflatable air bags on side of the vehicle between C and D roof support pillars of the vehicle;

tethering said air bags to said support pillars so that said air bags are vertically oriented between said pillars while in an uninflated state; and in response to a collision inflating said air bags with gas from an inflator device so that said air bags inflate outwardly from said body side.

8. The method of claim 7 wherein said rear seats are third row seats of a minivan or sport utility vehicle.

9. The method of claim 7 wherein said roof support pillars are the C pillar and the D pillar.

* * * * *